(12) United States Patent
Kallman et al.

(10) Patent No.: US 10,263,381 B2
(45) Date of Patent: Apr. 16, 2019

(54) SEALED CORROSION-RESISTANT CONTACTS

(71) Applicant: Apple Inc., Cupertino, CA (US)

(72) Inventors: Benjamin J. Kallman, Cupertino, CA (US); Michael B. Wittenberg, San Francisco, CA (US); Eric S. Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/665,249

(22) Filed: Jul. 31, 2017

(65) Prior Publication Data
US 2018/0083406 A1 Mar. 22, 2018

Related U.S. Application Data

(60) Provisional application No. 62/396,974, filed on Sep. 20, 2016.

(51) Int. Cl.
| | |
|---|---|
| H01R 13/405 | (2006.01) |
| H01R 43/20 | (2006.01) |
| H01R 43/00 | (2006.01) |
| H01R 12/70 | (2011.01) |
| H01R 12/77 | (2011.01) |
| H01R 13/52 | (2006.01) |
| G06F 1/00 | (2006.01) |
| H01R 13/73 | (2006.01) |

(52) U.S. Cl.
CPC ............ H01R 43/205 (2013.01); G06F 1/00 (2013.01); H01R 12/7047 (2013.01); H01R 12/774 (2013.01); H01R 12/777 (2013.01); H01R 13/521 (2013.01); H01R 13/73 (2013.01); H01R 43/005 (2013.01); *H01R 13/405* (2013.01); *H01R 13/5202* (2013.01); *Y10T 29/4922* (2015.01)

(58) Field of Classification Search
CPC .......................... H01R 13/405; Y10T 29/4922
See application file for complete search history.

(56) References Cited

U.S. PATENT DOCUMENTS

| | | | | | |
|---|---|---|---|---|---|
| 5,762,504 | A | * | 6/1998 | Itoh ..................... | G01R 1/07328 |
| | | | | | 439/197 |
| 7,144,275 | B2 | * | 12/2006 | Iida ...................... | H05K 5/0069 |
| | | | | | 439/587 |
| 7,275,958 | B2 | * | 10/2007 | Unruh .................. | F02M 51/005 |
| | | | | | 239/102.2 |
| 7,744,380 | B2 | * | 6/2010 | Shuey .................. | H01R 12/716 |
| | | | | | 439/607.5 |
| 2005/0101185 | A1 | * | 5/2005 | Gensert ................. | B60K 15/03 |
| | | | | | 439/587 |

* cited by examiner

*Primary Examiner* — Tho D Ta
(74) *Attorney, Agent, or Firm* — Kilpatrick Townsend & Stockton, LLP

(57) ABSTRACT

Contacts and connector assemblies that may be space efficient, provide direct connections to flexible circuit boards, provide corrosion resistance, prevent moisture leakage into an electronic device housing the connector assembly, are readily assembled, and have an aesthetically pleasing appearance.

26 Claims, 14 Drawing Sheets

SEALED CORROSION-RESISTANT CONTACTS

CROSS-REFERENCES TO RELATED APPLICATIONS

This application claims the benefit of U.S. provisional patent application No. 62/396,974, filed Sep. 20, 2016, which is incorporated by reference.

BACKGROUND

Electronic devices often include one or more connector receptacles though which they may provide and receive power and data. This power and data may be conveyed over cables having connector inserts at each end of a cable, which may be inserted into receptacles of the communicating electronic devices. In other electronic systems, contacts on a first device may be in physical and electrical contact with contacts on a second device, obviating the need for an intervening cable. In such systems, a first connector may be formed as part of the first electronic device, while a second connector may be formed as part of the second electronic device.

But these connectors consume space in electronic devices. The larger a connector is, the larger the electronic device may be, unless some degree of functionality is compromised. Further, while typical connector receptacles may be designed to be placed on a printed circuit board, smaller electronic devices may include flexible instead of printed circuit boards.

Also, the contacts in these various connectors may be exposed to liquids and fluids that may cause the contacts to corrode. For example, a user may purposely or inadvertently submerge or spill liquid on electronic device. This may cause one or more contacts to corrode, particularly where a voltage is present on the one or more contacts. This corrosion may impair the operation of the electronic device or cable and in severe cases may render the device or cable inoperable. This moisture may also leak into the electronic device causing further damage.

These electronic devices may be very popular and may therefore be manufactured in large volumes. Therefore it may be desirable that these contacts be readily manufactured such that demand for the devices may be met. Also, any reduction in cost in contacts may lead to a large reduction in total costs.

Also, it may be desirable that these contacts have an aesthetic appearance. For example, it may be desirable that these contacts have an appearance that matches an appearance of a device enclosure around the contacts.

Thus, what is needed are contacts and connector assemblies that may be space efficient, provide direct connections to flexible circuit boards, provide corrosion resistance, prevent moisture leakage into an electronic device housing the connector assembly, are readily assembled, and have an aesthetically pleasing appearance.

SUMMARY

Accordingly, embodiments of the present invention may provide contacts and connector assemblies that may be space efficient, provide direct connections to flexible circuit boards, provide corrosion resistance, prevent moisture leakage into an electronic device housing the connector assembly, are readily assembled, and have an aesthetically pleasing appearance.

An illustrative embodiment of the present invention may provide contacts and connector assemblies that may be space efficient by using an enclosure of an electronic device instead of a connector receptacle housing. That is, contacts may be placed in openings in device enclosures to eliminate the need for bulky connector receptacle housings. This may allow the device to be smaller, for additional functionality to be included in the electronic device, or a combination thereof.

These and other embodiments of the present invention may provide a connector assembly formed to connect to a flexible circuit board or other type of circuit board. One example may provide a connector assembly formed around tabs at an end of a flexible circuit board. The flexible circuit board may terminate in a left tab, a center tab, and a right tab. The left tab may have a first opening and a first attachment area on a front side. The right tab may have a first opening and a first attachment area on a front side. A first contact assembly may have a mating surface attached to the first attachment area of the left tab, while a second contact assembly may have a mating surface attached to the first attachment area of the right tab. A first support structure may be attached to a rear of the center tab and it may have a first opening and a second opening. A first bracket may be behind the left tab and the first support structure, and it may have a first opening and a second opening. A second bracket may be behind the right tab and the first support structure, and it may have a first opening and second opening. A third bracket may have contacting portions behind the first bracket and the second bracket, and the contacting portions may provide the third bracket with a first opening and a second opening.

In these and other embodiments of the present invention, one or more of the tabs may be split into one or more portions. Such a split may aid in aligning the connector assembly structures to the device enclosure. For example, the left tab may be split into a first portion and a second portion, where the first opening is on the first portion and the first attachment area is on the second portion. Also, the right tab may be split into a first portion and a second portion, where the first opening is on the first portion and the first attachment area is on the second portion.

In these and other embodiments of the present invention, the brackets and tabs may be fixed to a device enclosure using fasteners. These fasteners may be stainless steel screws, push pins, collets, or other fasteners. They may be inserted through the brackets and into holes or openings, which may be threaded, in the device enclosure. The fasteners may include a first fastener passing through the first opening of the third bracket, the first opening of the first bracket, and the first opening of the left tab. The fasteners may further include a second fastener passing through the second opening of the first bracket and the first opening of the first support structure, and a third fastener passing through the first opening of the second bracket and the second opening of the first support structure. A fourth fastener may be passed through the second opening of the third bracket, the second opening of the second bracket, and the first opening of the left tab. Again, each of these fasteners may terminate in holes or openings, which may be threaded, in the device enclosure or other structure associated with or fixed to the device enclosure.

In these and other embodiments of the present invention, the contact assemblies may include a contact body having a contact surface at a first end, where the contact surface is exposed at an opening of a device enclosure. The contact surfaces may thus be exposed to moisture, liquids, and other corroding substances. Accordingly, the contact body may be formed of, or clad or plated with, a corrosion-resistant material. For example, the contact body including the contact surface may be formed of, or clad or plated with, gold, palladium, a palladium silver alloy, copper, phosphor bronze, silver, yellow gold, a high entropy material, such as materials consistent with ASTM Standards B540, B563, B589, B683, B685, or B731, or other material or combination of materials.

The entry of these liquids or other fluids into an electronic device may be damaging. Accordingly, in this and other embodiments of the present invention, a sealing structure, such as an O-ring, gasket, or other seal may be placed around the contact body such that it is between the contact body and an opening passage in the device enclosure. This sealing structure may prevent moisture or water leakage into the electronic device housing the connector assembly.

More specifically, in this and other embodiments of the present invention, the contact assembly may include a contact body having a contact surface at a first end. A contacting portion may be riveted or otherwise attached to a second end of the contact body. The contacting portion may have a mating surface away from the second end of the contact body. A first injection molded housing may be around the contacting portion and the contact body, wherein the mating surface of the contacting portion is exposed. A second injection molded housing may be around the contact body. The second injection molded housing may be separate from, and spaced away from, the first injection molded housing, wherein the contact surface of the contact body is exposed. Instead of simply relying on the injection molded housings to prevent moisture ingress, embodiments of the present invention may further provide a sealing structure between the contact body and device enclosure. For example, an O-ring or other sealing structure may be placed around the contact body and between the first injection molded housing and the second injection molded housing.

In these and other embodiments of the present invention, contact assemblies may provide paths for power, signals, or both, between the electronic device housing the contact assemblies and a second device. For example, paths where data and power share two contacts may be provided by embodiments of the present invention. In these embodiments, data may RF or IF modulate the power supply, data and power may be time-division multiplexed, or another technique may be used. In other embodiments of the present invention, additional contacts may be needed in some circumstances. These contacts may be used to a much lesser extent. It may therefore be desirable to use more cost-effective materials and manufacturing processes for these contacts and then only make them accessible when needed. Accordingly, embodiments of the present invention may provide a number of surface-mount contacts on a front of the center tab. These contacts may be exposed though an opening in the device enclosure when needed. The opening may be sealed or otherwise covered after the contacts are used, or when the contacts are not needed. This may improve the manufacturability of the contacts and connector assemblies, thereby improving yield and reducing costs.

These and other embodiments of the present invention may provide contacts having an aesthetically pleasing or cosmetic appearance. For example, a surface of a contact may be provided with a finish that matches, or stylistically mismatches, a surrounding area of a device enclosure. The contacts may be finished, for example using blasting, polishing, tumbling, or other process to match an enclosure finish and to provide an aesthetically pleasing or cosmetic appearance.

In these and other embodiments of the present invention, other circuitry of the electronic device may be able to make use of portions of the connector assembly. For example, the third bracket may be used to convey current for a power supply, it may be used as an antenna, a guide or housing for an antenna, or it may be used for other purposes. For example, the third bracket may be a plastic housing for an antenna.

In various embodiments of the present invention, the contacts and their connector assemblies may be formed in various ways of various materials. For example, contacts and other conductive portions may be formed by stamping, coining, metal-injection molding, machining, micro-machining, 3-D printing, or other manufacturing process. The conductive portions may be formed of stainless steel, steel, copper, copper titanium, phosphor bronze, palladium, palladium silver, or other material or combination of materials, as described herein. They may be clad, plated, or coated with nickel, gold, palladium, or other material, as described herein. The nonconductive portions, such as the housings and other portions, may be formed using injection or other molding, 3-D printing, machining, or other manufacturing process. The nonconductive portions may be formed of silicon or silicone, Mylar, Mylar tape, rubber, hard rubber, plastic, nylon, elastomers, liquid-crystal polymers (LCPs), ceramics, or other nonconductive material or combination of materials.

Embodiments of the present invention may provide contacts and their connector assemblies that may be located in, or may connect to, various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These contacts and their connector assemblies may provide pathways for signals that are compliant with various standards such as Universal Serial Bus (USB), High-Definition Multimedia Interface® (HDMI), Digital Visual Interface (DVI), Ethernet, DisplayPort, Thunderbolt™, Lightning, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In various embodiments of the present invention, these interconnect paths provided by these contacts and connector assemblies may be used to convey power, ground, signals, test points, and other voltage, current, data, or other information.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
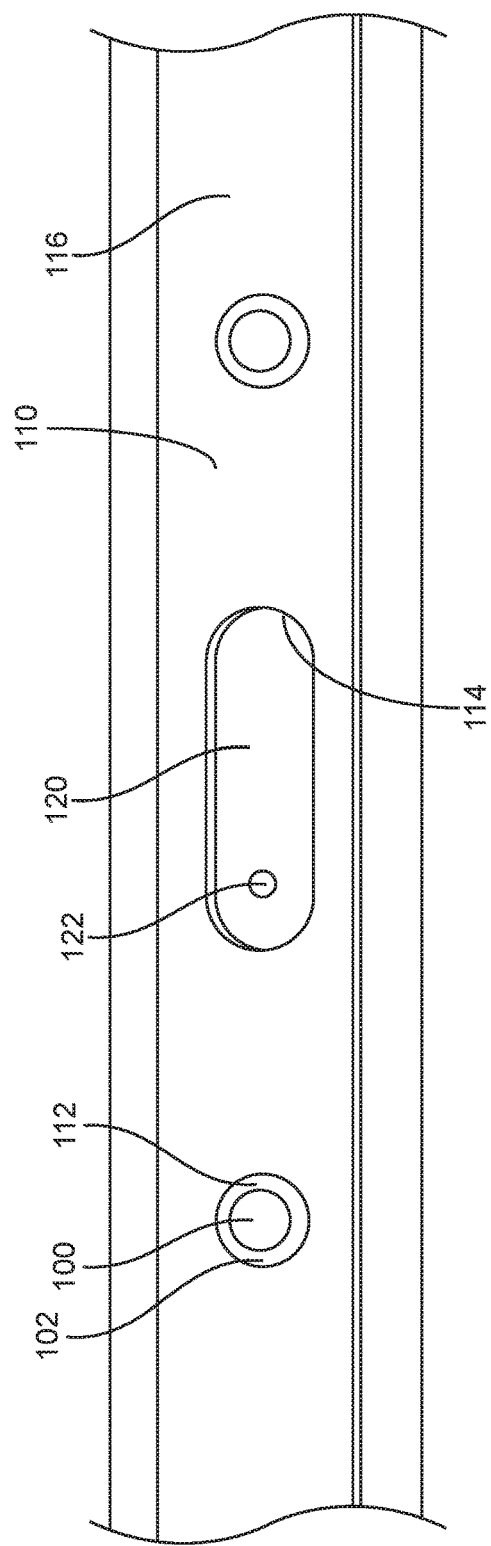
FIG. 1 illustrates a front view of an electronic device incorporating a connector assembly according to an embodiment of the present invention.

FIG. 1 illustrates a front view of an electronic device incorporating a connector assembly according to an embodiment of the present invention. This figure, as with the other included figures, is shown for illustrative purposes and does not limit either the possible embodiments of the present invention or the claims.

Contacts 100 of the connector assembly may be available at a surface of an electronic device housed in device enclosure 110. They may be located in a notch, groove, or other contoured surface portion 116 of device enclosure 110. Contacts 100 may have a contacting surface that is sub-flush (set behind) or substantially flush with, the local surface of the device enclosure 110. Contacts 100 may have surfaces that are curved or have other shapes to match (or purposefully mismatch) the contours of surface portion 116 of device enclosure 110 near contacts 100. Contacts 100 may be located in openings 112 in device enclosure 110 and contacts 100 may be insulated from device enclosure 110 by insulating rings 102.

The surfaces of contacts 100 may be formed having an aesthetically pleasing or cosmetic appearance. For example, a surface of contacts 100 may be provided with a finish that matches, or stylistically mismatches, a surrounding surface portion 116 of a device enclosure 110. Contacts 100 may be finished, for example using blasting, polishing, tumbling, or other process to match an enclosure finish and to provide an aesthetically pleasing or cosmetic appearance.

In this example, two contacts 100 are shown, though in other embodiments of the present invention, one, three, four, or more than four contacts may be included and available at a surface of device enclosure 110. These contacts 100 may form pathways for data signals, power, ground, or other data or power supply voltages. In these and other embodiments of the present invention, data and power may share two contacts 100. For example, the data may RF or IF modulate the power supply voltage, the data and the power may share the contacts 100 in a time-division multiplexing manner, or another technique may be used.

Since the surfaces of contacts 100 are exposed at a surface of device enclosure 110, they may encounter moisture, liquids, or other corrosive substances. Accordingly, embodiments of the present invention may include contacts 100 having surfaces that are formed of, or clad or plated with, corrosion resistive materials. For example, a contact body 600 (shown below in FIGS. 5-11), which may form a contact 100, may be formed of, or clad or plated with, gold, palladium, a palladium silver alloy, copper, phosphor bronze, silver, yellow gold, a high entropy material, such as materials consistent with ASTM Standards B540, B563, B589, B683, B685, or B731, or other material or combination of materials.

In various embodiments of the present invention, these contacts 100 may be used on a regular basis and so a relatively high cost of manufacturing to provide corrosion resistance contacts may be justified. In these in other embodiments of the present invention, it may be desirable to also include other additional contacts that are not regularly used, or at least used less often. For example, these additional contacts may be used for initial or restorative programming for the electronic device. In such a device, lower cost additional contacts may be used and they may be covered or otherwise not exposed at a surface of device enclosure 110 when not in use.

In this example, cover 120 may be placed in recess 114 of device enclosure 110. Cover 120 may be removed to expose these additional contacts. In these in other embodiments of the present invention, once these additional contacts are used, they may be sealed and covered by cover 120. Cover 120 may provide a cosmetic function as well, particularly when a color of the cover matches a color of the surrounding device enclosure 110. A dimple or raised portion 122 may be used to facilitate removal of cover 120. An example of these contacts is shown in the following figure.

Figure 2:
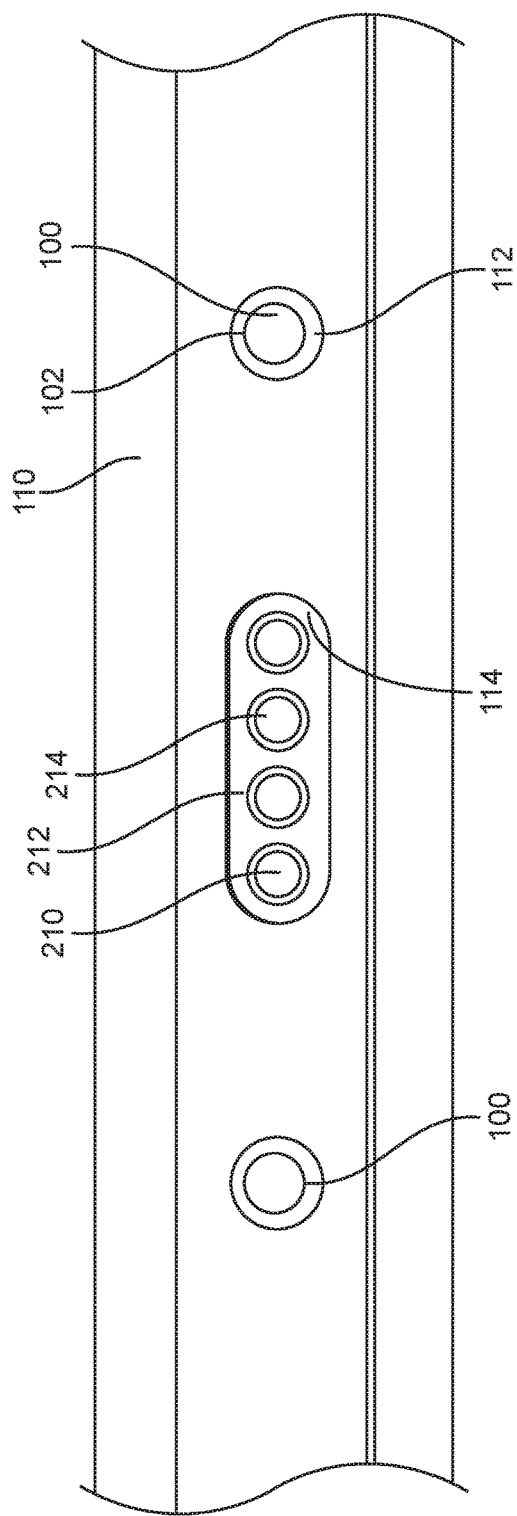
FIG. 2 illustrates a front of the electronic device of FIG. 1 where a protective cover has been removed.

FIG. 2 illustrates a front of the electronic device of FIG. 1 where a protective cover has been removed. In this example, cover 120 (as shown in FIG. 1) has been removed, thereby exposing additional contacts 210 in recess 114 in device enclosure 110. Additional contacts 210 may be located in opening 214 of insulator 212. Contacts 210 may be formed as solder pads, though they may be formed in other ways. Again, contacts 210 may be less robust and made using lower cost materials as compared to contacts 100, since they may be ordinarily covered. As before, contacts 100 may be located in openings 112 in device enclosure 110. Insulating rings 102 may isolate contacts 100 from device enclosure 110.

Various connector assemblies may be employed by embodiments of the present invention. In some devices, these connector structures may be very small and may have very precise alignment targets. Accordingly, embodiments of the present invention may employ various techniques and structures to simplify the manufacturing of these connector assemblies. An example is shown in the following figure.

Figure 3:
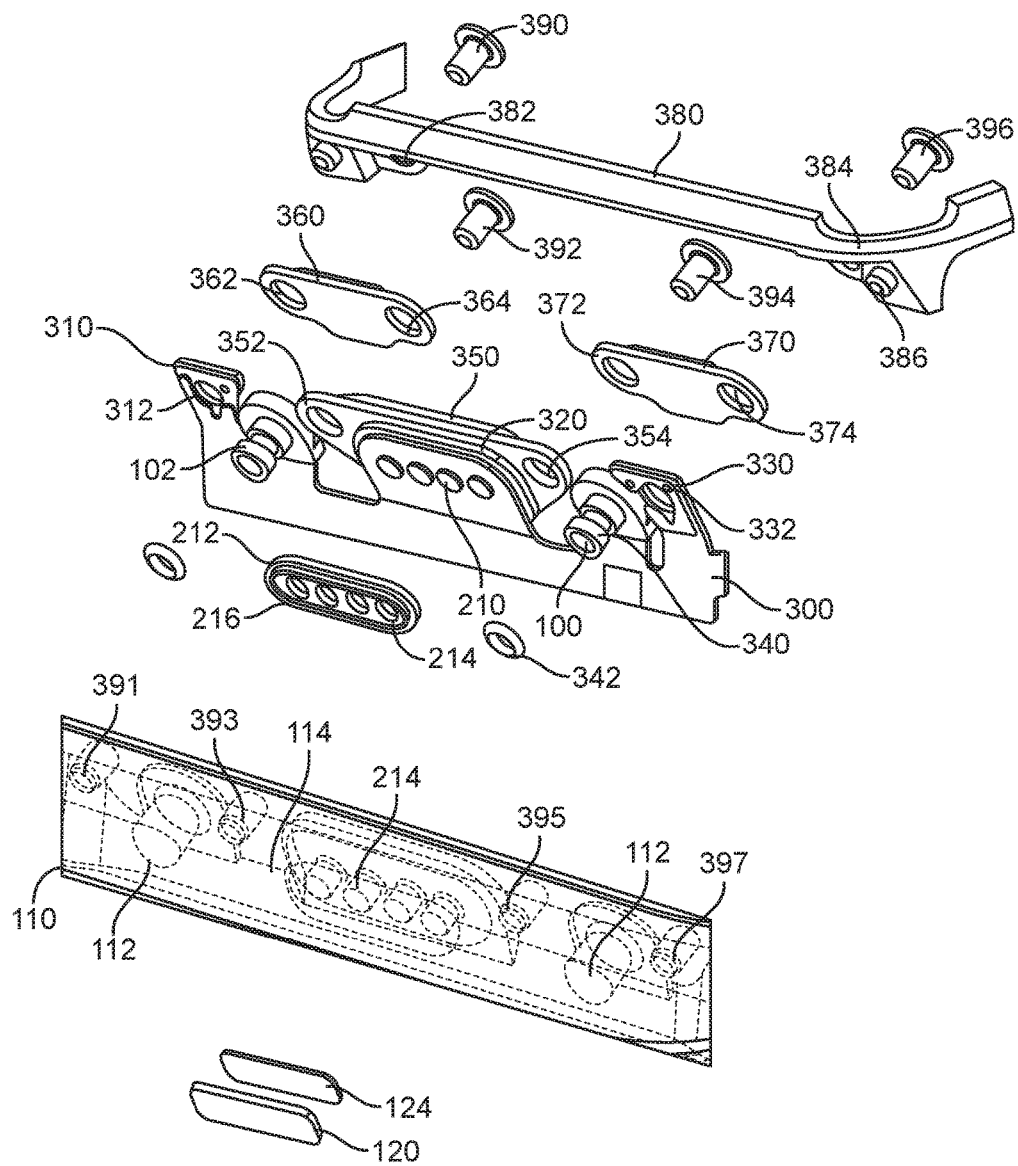
FIG. 3 illustrates an exploded view of a connector assembly according to an embodiment of the present invention.

FIG. 3 illustrates an exploded view of a connector assembly according to an embodiment of the present invention. Again, contacts 100 may be available at an opening 112 in device enclosure 110. Contacts 210 may be available at openings 112 in recess 114 in device enclosure 110. Contacts 210 may be available via openings 214 of insulator 212. Insulator 212 may include a rib or raised portion 216 to provide a seal to protect against the ingress of liquids through openings 112 in recess 114 in device enclosure 110 into the electronic device. Sealing components, such as O-rings 342, may fit around contact assemblies 340 to provide seals to protect against the ingress of liquids through openings 112 in device enclosure 110 into the electronic device. A cover 120 may be placed in recess 114. Cover 120 may be held in place by adhesive layer 124.

Contacts 210 may be formed at an end of flexible circuit board 300. Contacts 210 may be formed as solder pads on flexible circuit board 300, though they may be formed in other ways. Flexible circuit board 300 may terminate in a left tab 310, a center tab 320, and a right tab 330. Left tab 310 may include an opening 312 and an attachment area (not shown) for attaching a contact assembly 340. In various embodiments of the present invention, the left tabs may be split into two portions, where a first portion includes opening 312 and a second portion includes the attachment area. Right tab 330 may include an opening 332 and attachment area (not shown) for attaching a contact assembly 340. In these in other embodiments of the present invention, the right tab may be split into two portions, where a first portion may include opening 332 and a second portion may include the attachment area.

Center tab 320 may be mechanically supported by support structure 350. Support structure 350 may include a first opening 352 and a second opening 354. Support structure 350 may be conductive or nonconductive. For example, it may be formed of metal, plastic, or other material. A front surface of center tab 320 may support contacts 210.

In these and other embodiments of the present invention, various conductive or nonconductive brackets may be used to secure the various tabs to each other and to a device enclosure 110. In these and other embodiments of the present invention, one or more of these brackets may be used for other purposes. For example, they may be used to convey voltages or currents, they may be used as antennae or to provide mechanical holders or guides for antennae, or they may be used for other purposes. They may be formed of metal, plastic or other conductive or nonconductive material. In various embodiments of the present invention, a bracket (the third bracket 380 below) may be a plastic housing for an antenna.

In this example, a first bracket 360 may include a first opening 362 and a second opening 364. The first bracket 360 may be used to secure the left tab 310 to center tab 320. A second bracket 370 may include a first opening 372 and a second opening 374. The second bracket 370 may be used to secure the right tab 330 to the center tab 320.

A third bracket 380 may be used to secure the remainder of the connector assembly to device enclosure 110. Third bracket 380 may include a first opening 382 and a second opening 384. Third bracket 380 may further include posts 386 which may be inserted into corresponding holes in device enclosure 110.

In various embodiment of the present invention, the brackets may be secured to device enclosure 110 using fasteners. These fasteners may be stainless steel screws, push pins, collets, or other types of fasteners. They may be inserted into corresponding holes in device enclosure 110. The corresponding holes may be threaded. For example, fastener 390 may be inserted through first opening 382 of third bracket 380, first opening 362 of first bracket 360, opening 312 of left tab 310, and into to corresponding hole, opening, or recess 391 in device enclosure 110. Fastener 392 may be inserted through second opening 364 of first bracket 360, first opening 352 of support structure 350 and into corresponding hole, opening, or recess 393 in device enclosure 110. Similarly, fastener 394 may be inserted through first opening 372 of second bracket 370, through second opening 354 of support structure 350, and into hole, opening, or recess 395 in device enclosure 110. Fastener 396 may pass through second opening 384 on third bracket 380, second opening 374 on second bracket 370, opening 332 on right tab 330, and into corresponding hole, opening, or recess 397 in device enclosure 110.

Again, in various embodiments of the present invention, the two contact assemblies 340 may be used to convey power and data, where data is RF or IF modulated on the power supply. A low impedance ground path may help to facilitate data transfer using this method. Accordingly, the first opening 312 on left tab 310 and first opening 332 on right tab 330 may be plated and electrically connected to ground. Conductive screws or other fasteners 390 and 396 may be used to secure these grounded openings to the device enclosure, thereby reducing the impedance to ground for the connector assembly.

Figure 4:
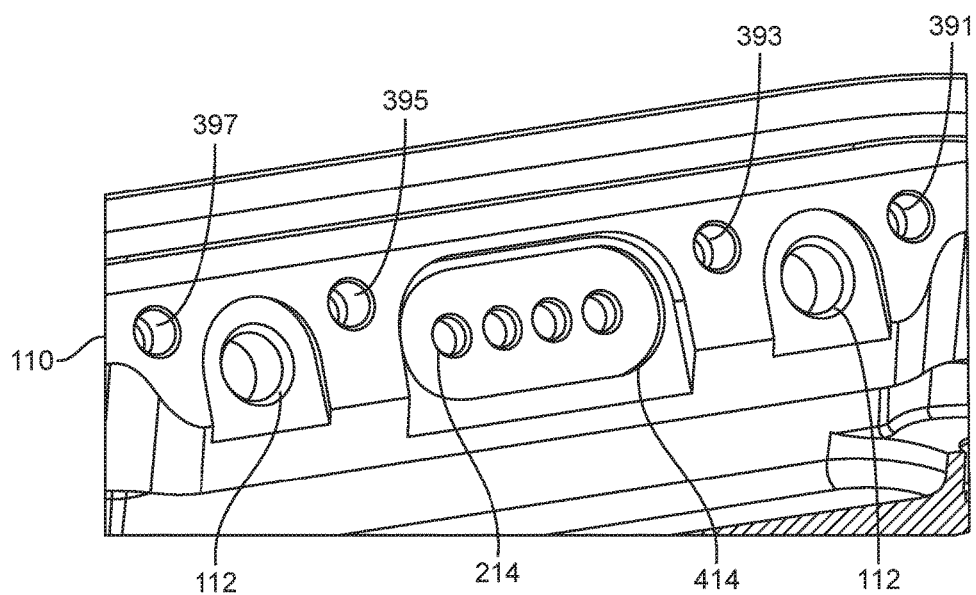
FIG. 4 illustrates a rear view of the device enclosure of FIG. 3.

FIG. 4 illustrates a rear view of the device enclosure of FIG. 3. Device enclosure 110 may include openings 112 for accepting contact assemblies 340 and for providing access to contacts 100 (as shown in FIG. 3). Device enclosure 110 may include recesses 391, 393, 395, and 397 for accepting fasteners 390, 392, 394, and 396, respectively (as shown in FIG. 3). Recess 414 may accept center tab 320 (as shown in FIG. 3). Openings 214 in recess 414 may provide access to contacts 210 (as shown in FIG. 2).

Figure 5:
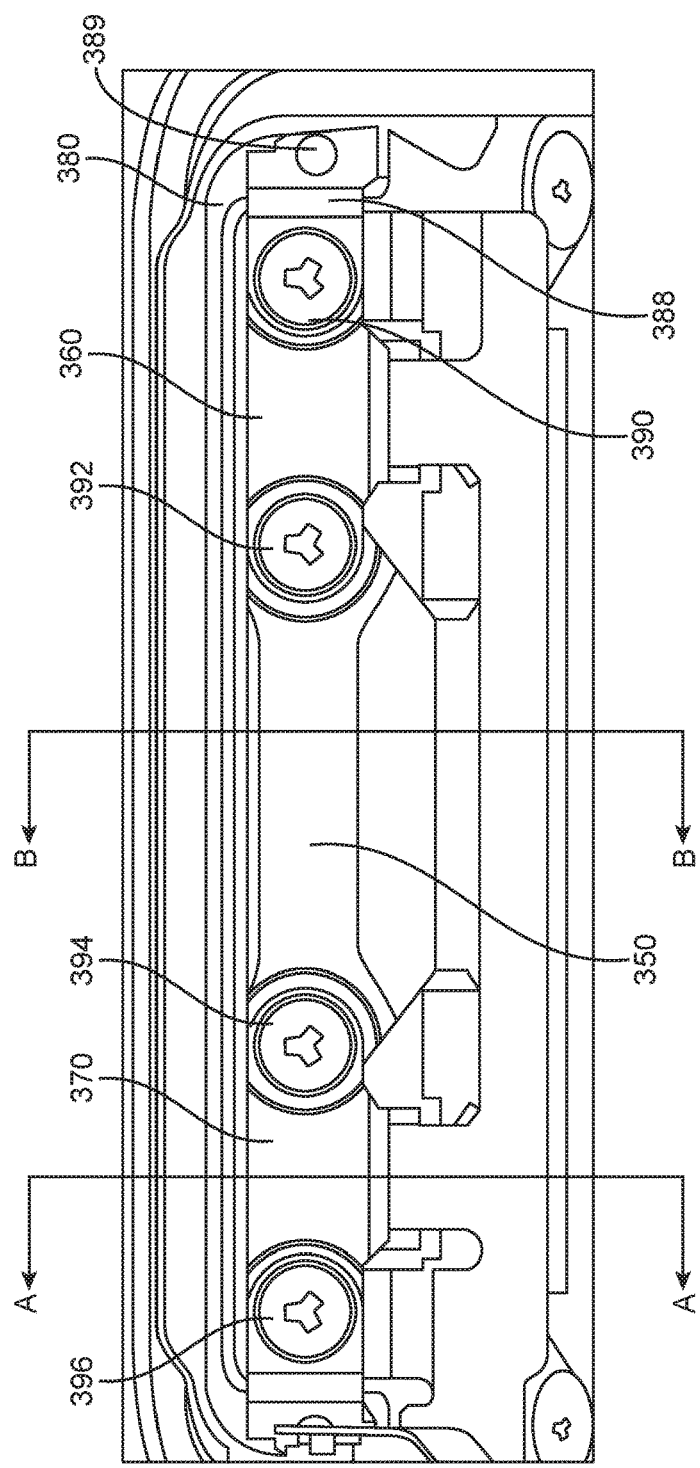
FIG. 5 illustrates a rear view of a connector assembly according to an embodiment of the present invention.

FIG. 5 illustrates a rear view of a connector assembly according to an embodiment of the present invention. Fastener 390 may be inserted into an opening in bracket piece 388. Bracket piece 388 may be soldered or laser or spot welded to third bracket 380 at point 389. Fastener 390 may also pass through an opening in first bracket 360. Fastener 392 may pass through an opening in bracket 360 and an opening in support structure 350. Fastener 394 may pass through opening and second bracket 370 and an opening in support structure 350. Fastener 396 may pass through another bracket piece 388, which may be similarly attached to third bracket 380. Fastener 396 may also pass through an opening in second bracket 370.

The contact assemblies 340 may be manufactured in various ways in various embodiments of the present invention. An example is shown in the following figures.

Figure 6:
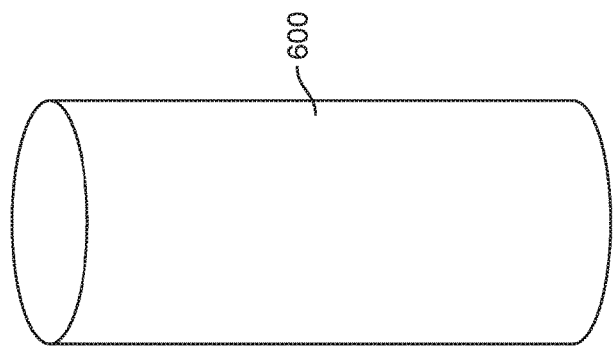
FIGS. 6-12 illustrates the manufacturing of a contact assembly according to an embodiment of the present invention.

FIGS. 6-12 illustrates the manufacturing of a contact assembly according to an embodiment of the present invention. FIG. 6 illustrates a contact body 600 that may be used in a contact assembly according to an embodiment of the present invention. This contact body may be formed of, or clad or plated with, one or more corrosion resistant materials. For example, contact body 600 and its surface may be formed of, or clad or plated with, gold, palladium, a palladium silver alloy, copper, phosphor bronze, silver, yellow gold, a high entropy material, such as materials consistent with ASTM Standards B540, B563, B589, B683, B685, or B731, or other material or combination of materials.

Figure 7:
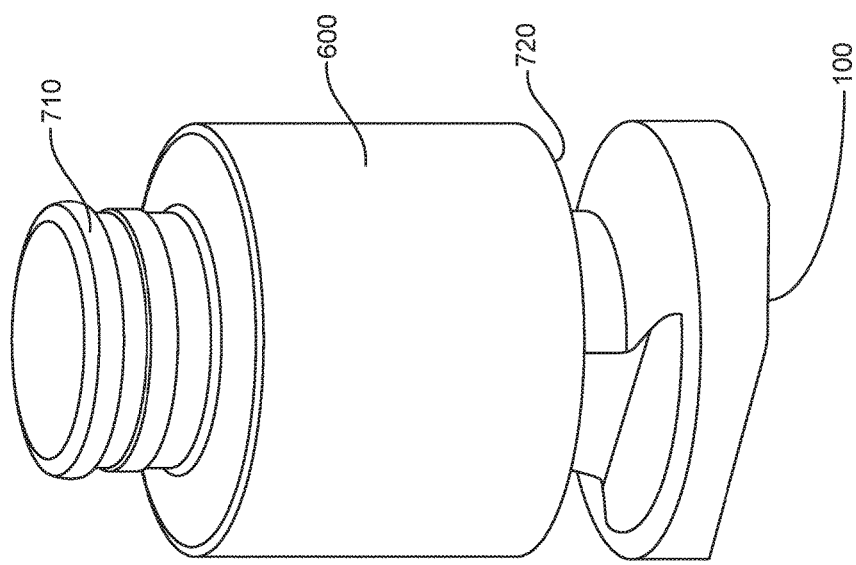

In FIG. 7, contact body 600 of contact 100 has been machining or otherwise altered to have a top narrow portion 710 and a band 720. Contacts 100 may be formed having an aesthetically pleasing or cosmetic appearance. For example, a surface of contact 100 may be provided with a finish that matches, or stylistically mismatches, a surrounding area of a device enclosure 110 (as shown in FIG. 1). Contacts 100 may be finished, for example using blasting, polishing, tumbling, or other process to match an enclosure finish and to provide an aesthetically pleasing or cosmetic appearance.

Figure 8:
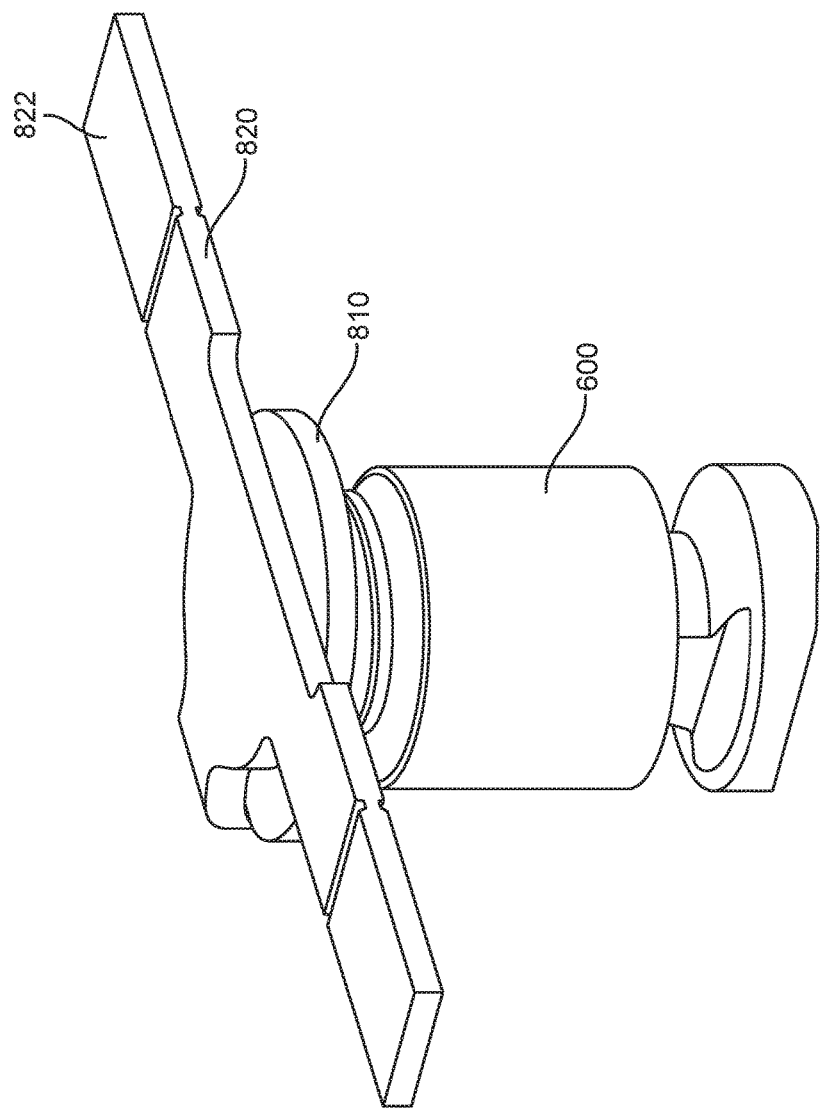

In FIG. 8, a contacting portion may be attached to the top narrow portion 710 (as shown in FIG. 7) of the contact body 600. The contacting portion may be formed of a better material for soldering than the contact body 600. The contacting portion may include a ring 810 that may fit over narrow portion 710. Narrow portion 710 of contact body 600 may be riveted to secure ring 810 in place. A portion of mating surface 820 may be pulled over a top of ring 810 as shown. Carrier portions 822 may be used in handling the contacting portions of several contacts such that several contacts may be processed at a time.

Figure 9:
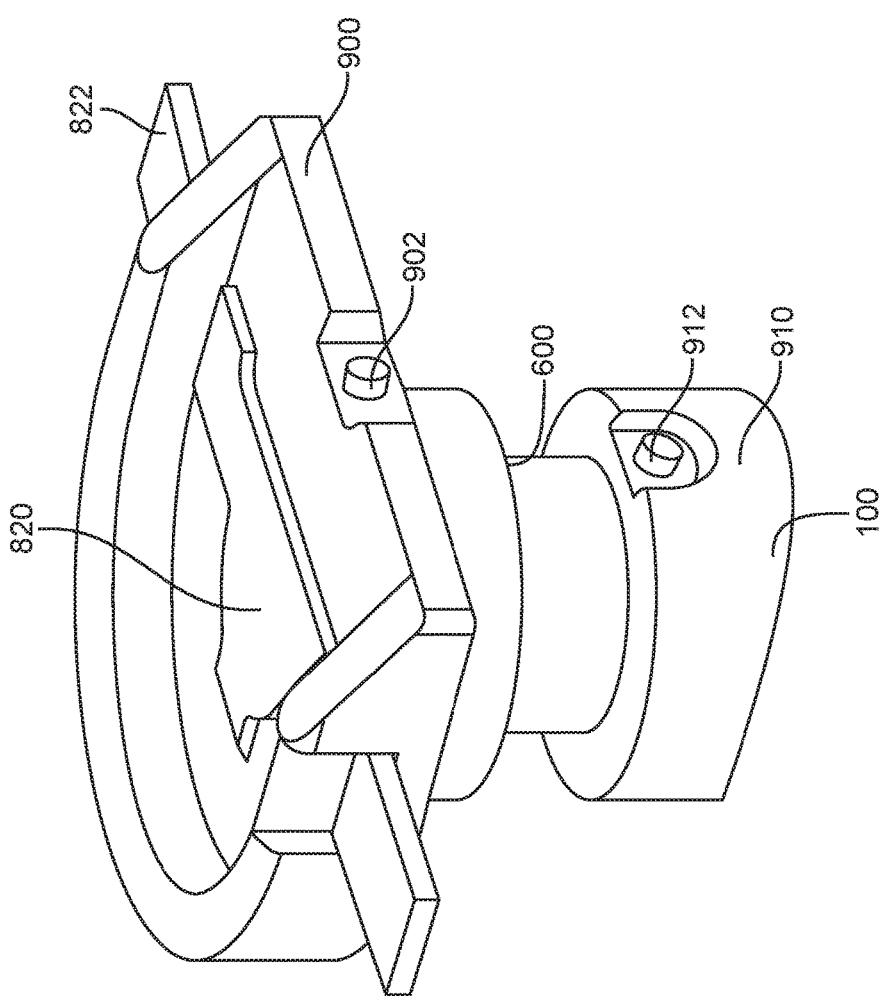
Figure 10:
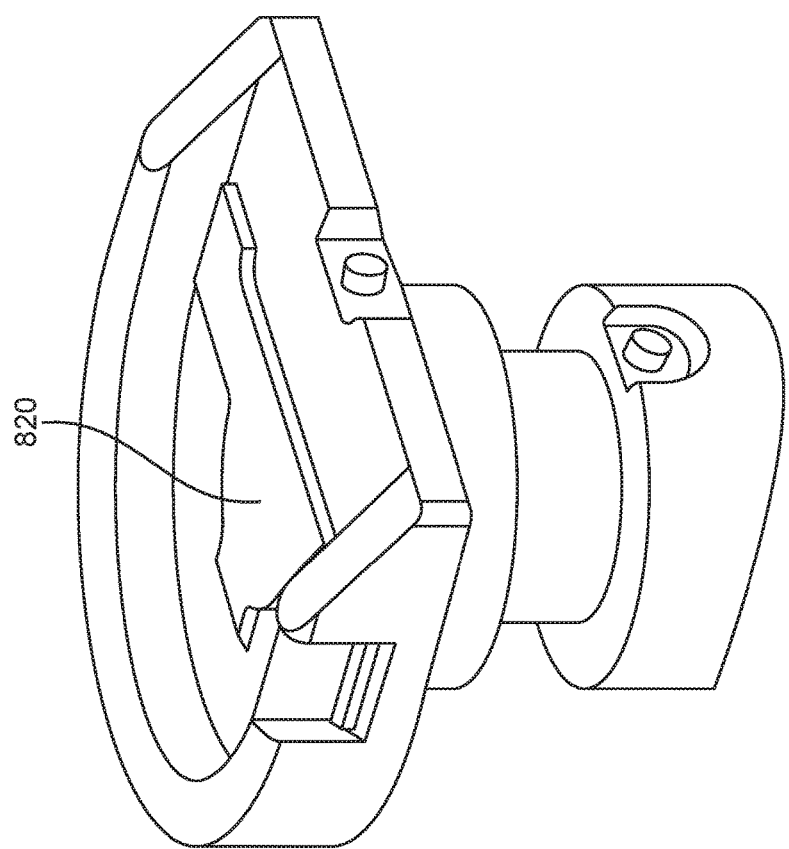
Figure 11:
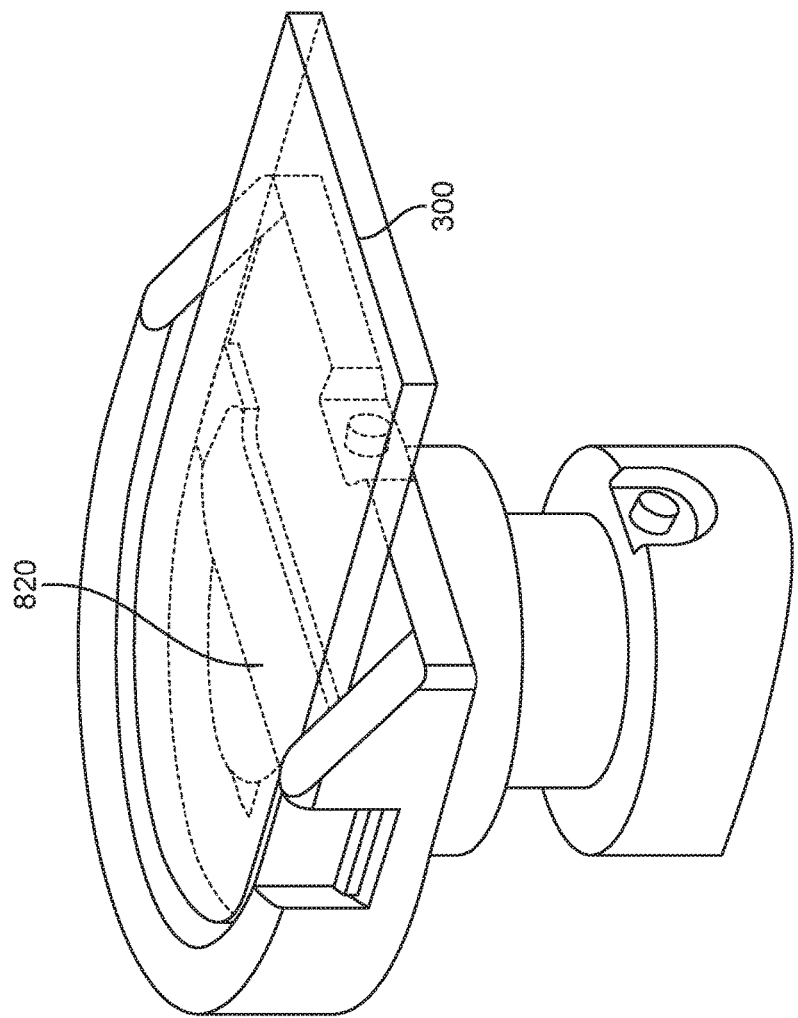

In FIG. 9, a first housing portion 900 may be formed around a top of contact body 600 and around the contacting portion of such that mating surface 820 is exposed. Gate 902 may be the gate for the molds to form first housing portion 900 during an injection molding process, an insert molding process, or other appropriate process. Similarly, a second housing portion 910 may be formed around a bottom of contact body 600 such that a surface of contact 100 remains exposed. In other embodiments of the present invention, second housing portion 910 may be formed and the surface of contact 100 and second housing portion 910 may be machined or otherwise formed together at the same time. Gate 912 may be the gate for the mold during the injection molding process, the insert molding process, or other appropriate process. Carrier portion 822 may be removed, leaving behind mating surface 820, thereby yielding the resulting structure shown in FIG. 10. In FIG. 11, a portion of flexible circuit board 300 may be attached to mating surface 820.

Figure 12:
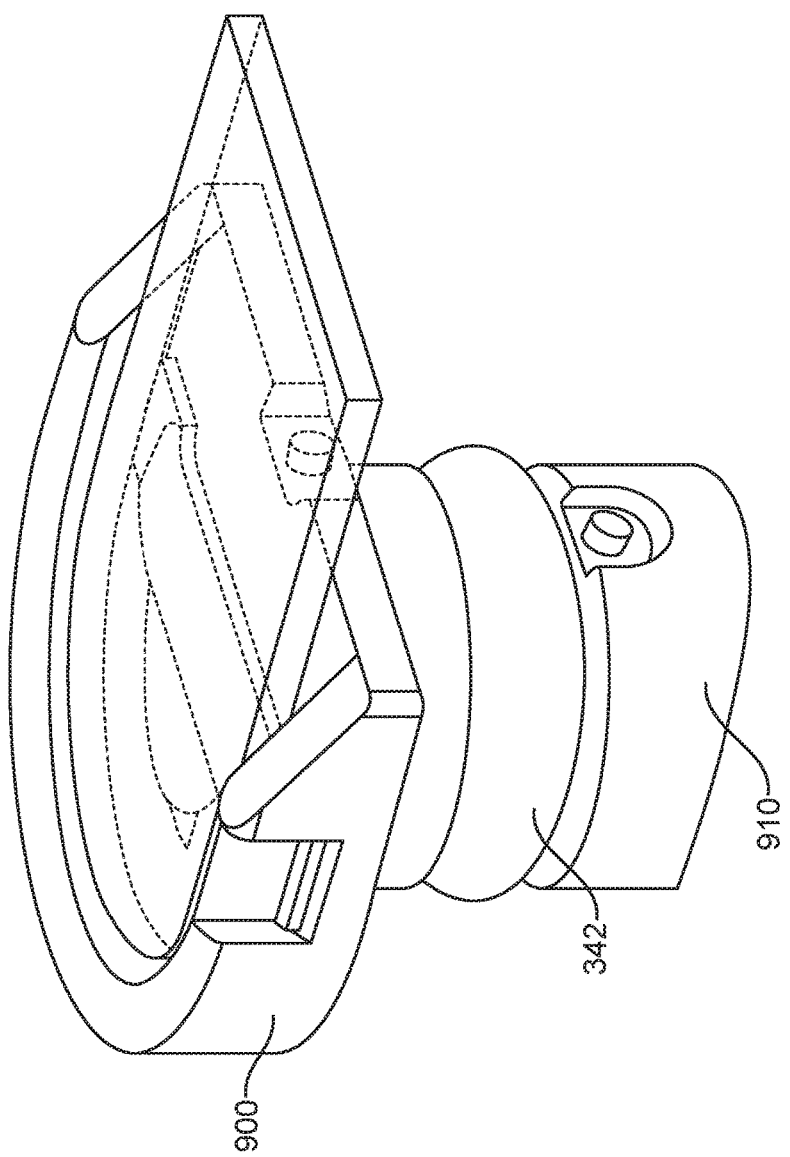

Again, it may be desirable to prevent or limit the ingress of liquids or other fluids into the electronic device housing these contacts assemblies. Accordingly, embodiments of the present invention may employ a sealing structure, such as a ring, gasket, or other seal. FIG. 12 illustrates a contact assembly having an O-ring 342 between first housing portion 900 and second housing portion 910. In various embodiments of the present invention, moisture may still reach the contact body 600 in the area between the second housing portion 910 and the O-ring 342. This moisture may corrode the contact body 600. To avoid this corrosion, embodiments of the present invention may coat the sides of the contact body 600 with a nonconductive material. For example, the contact body may be coated with a physical vapor deposition (PVD) to prevent corrosion. The PVD step may be performed before the contact body is machined to further reduce costs.

Figure 13:
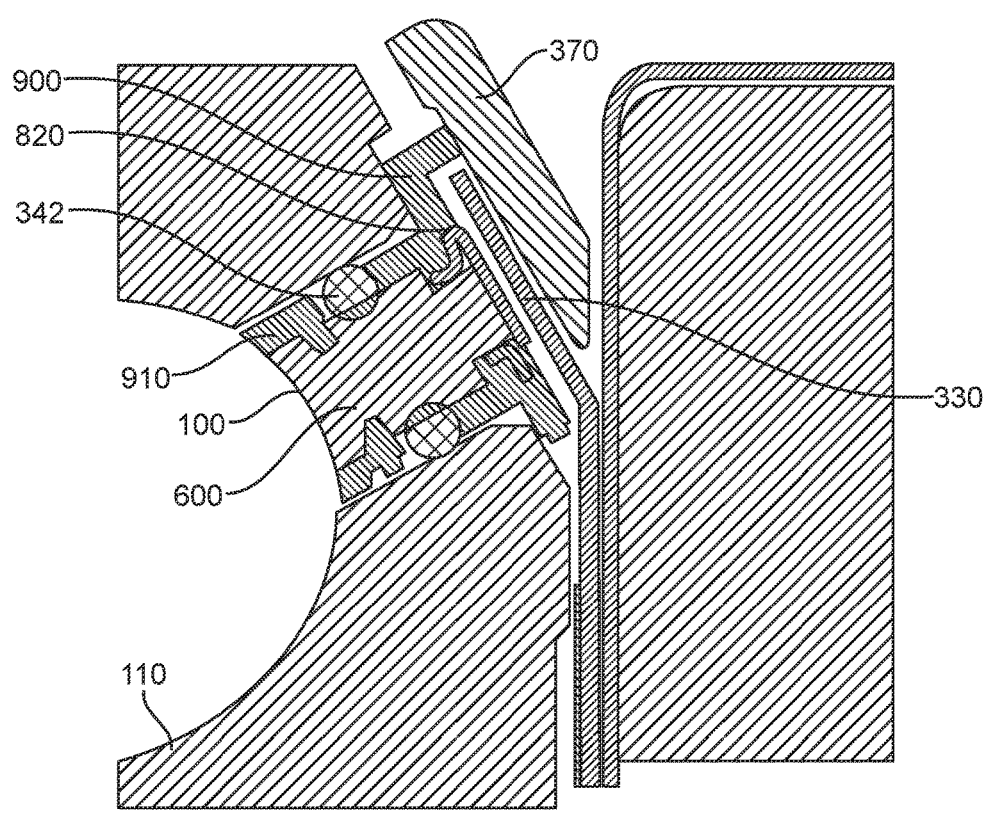
FIG. 13 illustrates a side view of a connector assembly according to an embodiment of the present invention.

FIG. 13 illustrates a side view of a connector assembly according to an embodiment of the present invention. This side view is taken along cut-line A-A as shown in FIG. 5. Contact body 600 may have a curved contacting surface exposed at a surface of device enclosure 110. Contact body 600 may be insulated from device enclosure 110 by second housing portion 910, an outside surface of which may be insulating ring 102 in FIG. 1 and FIG. 3. Contact body 600 may further be insulated from device enclosure 110 by first housing portion 900.

Instead of relying on the first housing portion 900 and second housing portion 910 to prevent moisture or liquid ingress into the electronic device, embodiments of the present invention may employ a sealing structure between the contact body 600 and device enclosure 110. In this example, an O-ring 342 between contact body 600 and device enclosure 110, and further between first housing portion 900 and second housing portion 910, may limit the ingress of fluids or other damaging materials into the electronic device. In this way, the first housing portion 900 and second housing portion 910 may electrically insulate or isolate the contact body 600 from the device enclosure 110 while O-ring 342 prevents leakage past the contact body 600. A contacting portion including mating surface 820 may be attached to contact body 600 by riveting as described above. Mating surface 820 may be physically and electrically connected to an attach area (not shown) of flexible circuit board 300. Second bracket 370 may be located behind the left tab 310 of flexible circuit board 300 (as shown in FIG. 3.)

Figure 14:
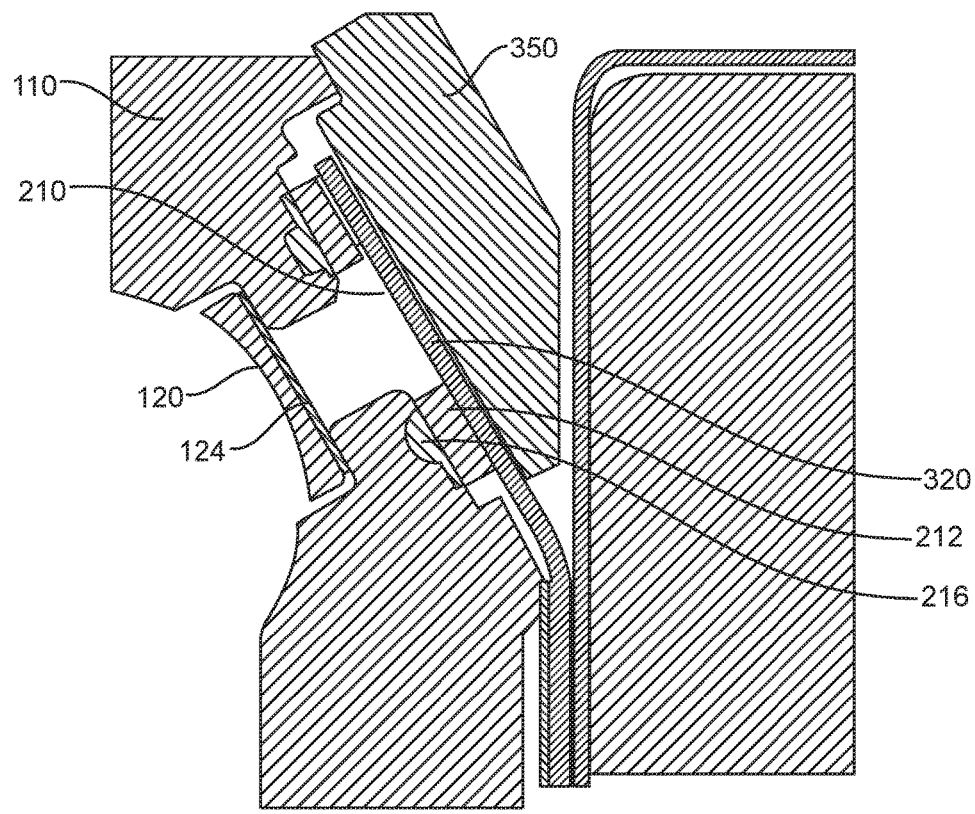
FIG. 14 illustrates another side view of a connector assembly according to an embodiment of the present invention.

FIG. 14 illustrates another side view of a connector assembly according to an embodiment of the present invention. This side view is taken along cut-line B-B as shown in FIG. 5. Cover 120 may be secured to device enclosure 110 by adhesive layer 124. Contacts 210 may have a curved surface and may reside on center tab 320 of flexible circuit board 300 (as shown in FIG. 3.) Support structure 350 may be located behind center tab 320. Insulator 212, which may be a gasket, may include rib or raised portion 216, which may provide a seal protecting against the ingress of liquids or other fluids into the electronic device.

In various embodiments of the present invention, the components of contacts and their connector assemblies may be formed in various ways of various materials. For example, contacts and other conductive portions may be formed by stamping, coining, metal-injection molding, machining, micro-machining, 3-D printing, or other manufacturing process. The conductive portions may be formed of stainless steel, steel, copper, copper titanium, phosphor bronze, palladium, palladium silver, or other material or combination of materials, as described herein. They may be clad, plated, or coated with nickel, gold, palladium, or other material, as described herein. The nonconductive portions, such as the housings and other portions, may be formed using injection or other molding, 3-D printing, machining, or other manufacturing process. The nonconductive portions may be formed of silicon or silicone, Mylar, Mylar tape, rubber, hard rubber, plastic, nylon, elastomers, liquid-crystal polymers (LCPs), ceramics, or other nonconductive material or combination of materials.

Embodiments of the present invention may provide contacts and their connector assemblies that may be located in, or may connect to, various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These contacts and their connector assemblies may provide pathways for signals that are compliant with various standards such as Universal Serial Bus, High-Definition Multimedia Interface, Digital Visual Interface, Ethernet, DisplayPort, Thunderbolt, Lightning, Joint Test Action Group, test-access-port, Directed Automated Random Testing, universal asynchronous receiver/transmitters, clock signals, power signals, and other types of standard, non-standard, and proprietary interfaces and combinations thereof that have been developed, are being developed, or will be developed in the future. In various embodiments of the present invention, these interconnect paths provided by these connectors may be used to convey power, ground, signals, test points, and other voltage, current, data, or other information.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:
1. A connector assembly comprising:
 a flexible circuit board terminating in a left tab, a center tab, and a right tab, the left tab having an opening and an attachment area on a front side, the right tab having an opening and an attachment area on a front side;

a first contact assembly having a mating surface attached to the attachment area of the left tab;

a second contact assembly having a mating surface attached to the attachment area of the right tab;

a support structure attached to a rear of the center tab, the support structure having a first opening and a second opening;

a first bracket behind the left tab and the support structure and having a first opening and a second opening;

a second bracket behind the right tab and the support structure and having a first opening and a second opening; and a third bracket having bracket portions behind the first bracket and the second bracket, the bracket portions having a first opening and a second opening.

2. The connector assembly of claim 1 wherein the third bracket is a housing for an antenna.

3. The connector assembly of claim 1 further comprising a plurality of contacts on a front surface of the center tab.

4. The connector assembly of claim 3 further comprising:
a first fastener through the first opening of the third bracket, the first opening of the first bracket, and the opening of the left tab;
a second fastener through the second opening of the first bracket and the first opening of the support structure;
a third fastener through the first opening of the second bracket and the second opening of the support structure; and
a fourth fastener through the second opening of the third bracket, the second opening of the second bracket, and the opening of the right tab.

5. The connector assembly of claim 4 wherein the left tab is split into a first portion and a second portion, the opening on the first portion and the attachment area on the second portion, and wherein the right tab is split into a first portion and a second portion, the opening on the first portion and the attachment area on the second portion.

6. The connector assembly of claim 5 wherein each contact assembly comprises:
a contact body having a contact surface at a first end;
a contacting portion attached to a second end of the contact body, the contacting portion having a mating surface away from the second end of the contact body;
a first injection molded housing around the contacting portion and the contact body, wherein the mating surface of the contacting portion is exposed;
a second injection molded housing around the contact body, the second injection molded housing separate from, and spaced away from, the first injection molded housing, wherein the contact surface of the contact body is exposed; and
an O-ring around the contact body and between the first injection molded housing and the second injection molded housing.

7. A connector assembly comprising:
a contact assembly comprising:
a contact body formed of a first material and having a contact surface at a first end;
a contacting portion formed of a second material, the second material different from the first material, and attached to a second end of the contact body, the contacting portion having a mating surface away from the second end of the contact body;
a first housing around the contacting portion and the contact body, wherein the mating surface of the contacting portion is exposed;
a second housing around the contact body, the second housing separate from, and spaced away from, the first housing, wherein the contact surface of the contact body is exposed; and
a sealing component around the contact body and between the first housing and the second housing.

8. The connector assembly of claim 7 wherein the contacting portion is formed separately from the contact body.

9. The connector assembly of claim 7 wherein the sealing component is circumferentially around the contact body.

10. The connector assembly of claim 7 wherein the sealing component is around a perimeter of the contact body.

11. The connector assembly of claim 7 wherein the first material is consistent with ASTM Standard B540.

12. The connector assembly of claim 7 wherein the first material is consistent with ASTM Standard B540 and the second material comprises copper.

13. The connector assembly of claim 7 wherein the contact body is clad with a material consistent with ASTM Standard B540.

14. The connector assembly of claim 7 wherein the contacting portion is riveted to the contact body.

15. The connector assembly of claim 14 wherein the first housing and the second housing are insert-molded housings.

16. The connector assembly of claim 15 wherein the mating surface is arranged to be attached to a flexible circuit board.

17. The connector assembly of claim 16 wherein the sealing component is an O-ring.

18. The connector assembly of claim 17 wherein the contact body is machined to have a curved contact surface.

19. The connector assembly of claim 18 wherein the contact body is further machined to have a narrowed portion at the second end, wherein the second end is riveted to the contact body.

20. The connector assembly of claim 19 wherein the contacting portion is formed as part of a carrier before being attached to the contact body.

21. A method of manufacturing a connector assembly, the method comprising:
forming a contact assembly by:
machining a contact body to have a contact surface at a first end and a narrowed portion at a second end;
attaching a contacting portion to a second end of the contact body, the contacting portion having a mating surface away from the second end of the contact body;
injection molding a first housing around the contacting portion and the contact body such that the mating surface of the contacting portion is exposed;
injection molding a second housing around the contact body, the second housing separate from, and spaced away from, the first housing, such that the contact surface of the contact body is exposed; and
placing a sealing component around the contact body and between the first housing and the second housing.

22. The method of claim 21 wherein the contacting portion is attached to the contact body by riveting.

23. The method of claim 22 wherein the mating surface is arranged to be attached to a flexible circuit board.

24. The method of claim 23 wherein the sealing component is an O-ring.

25. The method of claim 24 wherein the contact body is machined to have a curved contact surface.

26. The method of claim 25 wherein the contact body is computer numerical control (CNC) machined.

* * * * *